J. C. SEAMEANS.
Wagon-Gearing.

No. 168,347.  Patented Oct. 5, 1875.

UNITED STATES PATENT OFFICE.

JULIAN C. SEAMEANS, OF VIRGIL, NEW YORK.

IMPROVEMENT IN WAGON-GEARINGS.

Specification forming part of Letters Patent No. 168,347, dated October 5, 1875; application filed August 11, 1875.

*To all whom it may concern:*

Be it known that I, JULIAN C. SEAMEANS, of Virgil, county of Cortland and State of New York, have invented an Improvement in Wagon-Gearings, of which the following is a specification:

My invention consists in attaching the cross-spring in that class of wagon-gearings commonly called platform-gearings to the splinter-bars at the forward end of the wagon, or to the body of the carriage at the rear end, by a hinge in the center of such spring, to relieve the body from the rocking motion given it in the ordinary gearing, when the wheels upon either side pass over obstructions, and also to relieve the platform and body from the tendency to twist or rack produced by the wheels successively passing over such obstructions.

My invention is illustrated more in detail by the accompanying drawings, in which—

Figure 1:
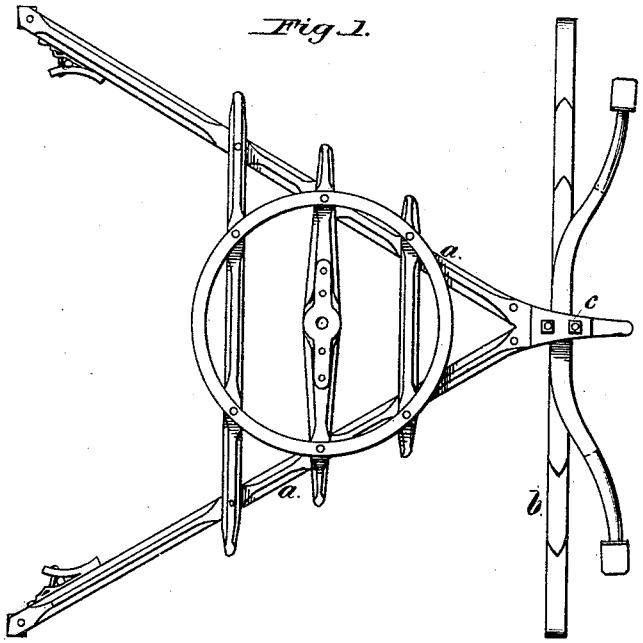
Figure 2:
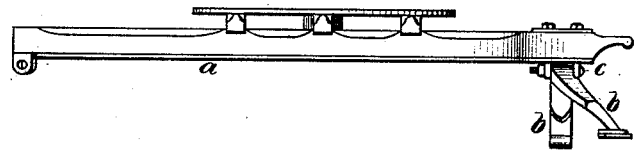
Figure 3:
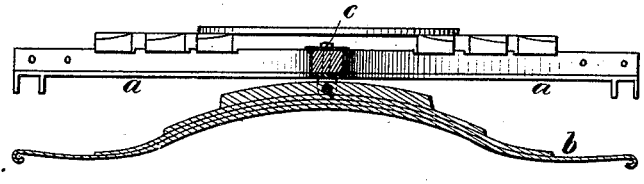

Figure 1 represents the cross-spring as applied to the splinter-bars, the hinge not being shown. Fig. 2 represents a side view of the splinter-bar with spring attached by the hinge at $c$. Fig. 3 is a rear view of the splinter-bars and spring hinged to the bars at $c$.

The splinter-bars $a$ $a$ may be put together in any of the ordinary methods to form the bed upon which the forward part of the carriage-body rests. The cross-spring $b$ is in the usual form, connecting at its outer ends with the lateral springs, which rest upon the axle-trees. At the center of the cross-spring is a hinge, $c$, by which it is attached directly to the splinter-bars, or to the head-block upon which they rest, allowing a rocking motion in the splinter-bars on such springs. Heretofore the cross-spring has been rigidly fastened to the bars or block resting upon such spring, the tendency of such construction being to allow of a twisting or working loose of the splinter-bars, or of the frame composed of them.

By my construction as above the splinter-bars substantially rest upon three points or pivots in the form of a triangle—viz., the two points at the forward ends of the lateral springs and the hinge $c$. I claim thus to avoid all tendency to twist any portion of the structure above the springs. I do not confine the use of the hinge as applied to the spring to the forward part of the wagon or carriage alone, but also apply it to any cross-spring under the rear portion of the carriage or wagon body.

In the rear of the ordinary platform-wagon the hinge would be on the cross-spring, connecting the rear ends of the lateral springs, but in a coach or phaeton the hinge would be on the cross-spring connecting the forward end of such lateral springs, and in either case would allow of a sidewise rocking motion in the wagon-body on such cross-spring.

I claim—

The hinge $c$, in combination with the splinter-bars $a$ $a$ and the cross-spring $b$, all substantially as and for the purpose set forth.

JULIAN C. SEAMEANS.

Witnesses:
R. H. DUELL,
JAMES A. NIXON.